United States Patent [19]

DeGree et al.

[11] Patent Number: 4,574,879
[45] Date of Patent: Mar. 11, 1986

[54] MOUNTING PAD FOR SOLID-STATE DEVICES

[75] Inventors: David C. DeGree, Burnsville; Herbert J. Fick; Bruce H. Juenger, both of Northfield, all of Minn.

[73] Assignee: The Bergquist Company, Minneapolis, Minn.

[21] Appl. No.: 584,897

[22] Filed: Feb. 29, 1984

[51] Int. Cl.[4] .......................... F28F 3/00; B32B 25/20; B32B 33/00; H05K 7/20
[52] U.S. Cl. ................................ 165/185; 174/16 HS; 174/138 G; 361/403; 428/447; 428/473.5
[58] Field of Search .................... 174/16 HS, 138 G; 165/80 B, 185, DIG. 8; 361/386, 387, 388, 389, 403; 428/447, 473.5, 477.7

[56] References Cited

U.S. PATENT DOCUMENTS

| | | | |
|---|---|---|---|
| 3,391,242 | 7/1968 | Sudges | 174/16 HS |
| 4,448,840 | 5/1984 | Matsushita | 428/447 X |
| 4,471,837 | 9/1984 | Larson | 165/185 |

FOREIGN PATENT DOCUMENTS 2480488 10/1981 France .......................... 174/16 HS

OTHER PUBLICATIONS

Donegan, M. J. et al., "Heat Conducting Washer", IBM Technical Disclosure Bulletin, vol. 8, No. 1, Jun. 1965, p. 206.

Primary Examiner—Laramie E. Askin
Attorney, Agent, or Firm—Orrin M. Haugen; Thomas J. Nikolai

[57] ABSTRACT

A thermally conductive electrically insulative laminate for use as chassis barriers in combination with solid-state electronic devices, the laminate comprising at least three layers and including a pair of outer layers disposed on opposite sides of a center layer. The center layer comprises a film of a polyimide (amide) filled with a quantity of either aluminum oxide or boron nitride particulate solids and included in an amount ranging from between about 10% to about 50% by volume. The outer layers consist essentially of silicone base rubber, and are preferably filled with a quantity of aluminum oxide or boron nitride particulate solids in an amount ranging from between about 25% and 50% by volume.

5 Claims, 3 Drawing Figures

MOUNTING PAD FOR SOLID-STATE DEVICES

BACKGROUND OF THE INVENTION

The present invention relates generally to an improved thermally conductive and electrically insulative laminate for use as a mounting pad and electrical chassis barrier in combination with solid-state electronic devices, particularly wherein it is desired that an electrically insulative layer be interposed between the thermally conductive base of the solid-state device and the chassis or other ultimate heat sink. The properties required are that the laminates be both thermally conductive, electrically insulative, and conformable, a combination of properties not readily found in nature.

Materials, including elements, compounds, and compositions of matter rarely possess the combined properties of being both thermally conductive and electrically insulative. Since the number of materials possessing such a combination of properties is relatively limited, one must seek compromises in other physical and electrical properties in order to find a useful material. Also, one technique for decreasing the thermal impedance in an electrically insulative material is to provide a material with an extremely thin cross-sectional thickness. However, as the cross-sectional thickness decreases, the risk of rupture, cracking, or fracture of the material increases, thereby increasing the risk for electrical failures.

Further desirable properties or characteristics include toughness, and mechanical durability, these properties rendering the barrier member resistant to cutting, ripping, cracking, or puncturing. In addition, it is desirable that the barrier member be at least modestly pliable so as to increase the area of surface contact in order to maximize the heat transfer. The mechanical properties are desirable in order to provide an electrical chassis barrier member which is sufficiently tough and durable to withstand the forces of oven-torqued mounting screws, and furthermore reduce the occurrences of burr cut-through or cracking, which are frequent occurrences in production operations.

With respect to other physical-thermal properties which are desirable for use in combination with high power type solid-state devices, and in addition to being thermally conductive, it is desirable that the material possess a high temperature capability so that exposure to molten solder may be tolerated. Accordingly, wave-soldering techniques may be employed with the product of the present invention, and high temperature problems such as high temperature creep will not be likely to occur. Furthermore, because of the demands of production processes, both solvent and chemical resistant properties are desirable.

In the past, it has been suggested that a polyimide (amide) film be utilized for use in combination with power type semiconductor devices, such as transistors and the like. Additionally, wax coatings or the like have been suggested for use with such films, however it has been found that such coatings are undesirable, particularly from the standpoint of high-temperature deterioration which may result over periods of extended usage in combination with this type of device.

SUMMARY OF THE INVENTION

In accordance with the present invention, a thermally conductive electrically insulative member is provided, with the member comprising a relatively thin laminate which is both tough and durable, with good electrical and mechanical properties, and having high temperature capabilities including resistance to high temperature problems including high pressure creep. The laminate includes at least three layers with a pair of outer layers disposed on opposite sides of a center film layer. The center layer comprises a polyimide (amide) film filled with a quantity of a particulate solid selected from the group consisting of aluminum oxide and boron nitride, and with the outer layers consisting essentially of silicone rubber preferably containing a quantity of a particulate solid, preferably aluminum oxide or boron nitride. The combination of physical and electrical properties available from the laminate are indicated above, and have been found to provide a highly desirable mounting pad or chassis barrier for use in the mounting of solid-state electronic devices onto heat dissipating chassis or other heat sink assemblies.

Therefore, it is a primary object of the present invention to provide an improved thermally conductive electrically insulative member which is mechanically tough, resistant to deterioration upon exposure to chemicals and solvents, and with high temperature capability which significantly reduces or eliminates high temperature deterioration of physical properties including high temperature creep.

It is a further object of the present invention to provide an improved thermally conductive electrically insulative member for use as a chassis barrier in combination with solid-state electronic devices, wherein the member comprises a laminate of at least three layers, and including a center layer of a polyimide (amide) film filled with a quantity of aluminum oxide or boron nitride in particulate solid form and outer layers of compounded silicone rubber.

Other and further objects of the present invention will become apparent to those skilled in the art upon a study of the following specification, appended claims, and accompanying drawing.

IN THE DRAWING

DESCRIPTION OF THE PREFERRED EMBODIMENT

Figure 1:
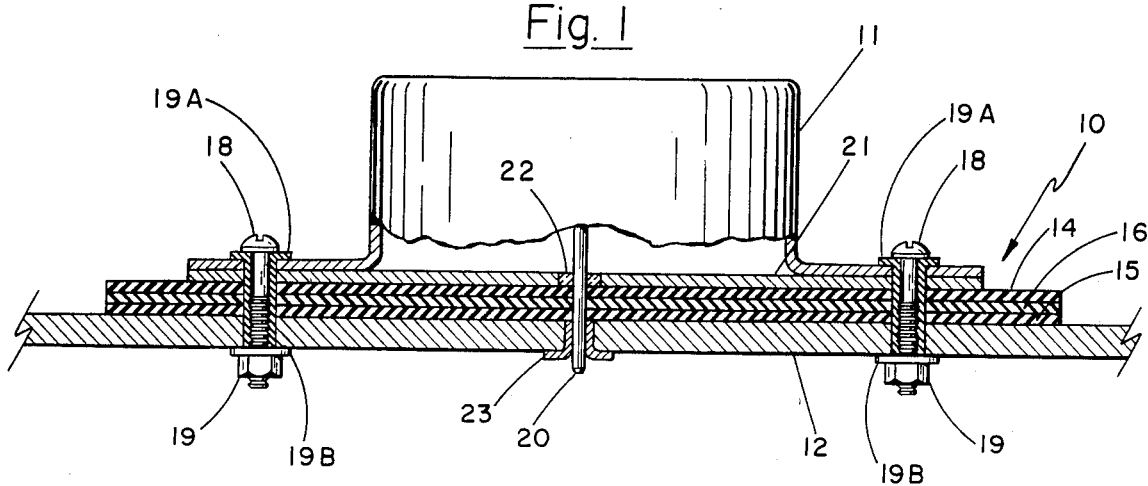
FIG. 1 is an elevational view, partially in section, illustrating a typical application of the thermally conductive electrically insulative mounting pad prepared in accordance with the present invention, and illustrating the manner in which such a device is typically interposed between a solid-state electronic device such as a transistor and a base chassis.

In accordance with the preferred embodiment of the present invention, the thermally conductive electrically insulative member generally designated 10 is utilized as a chassis mounting barrier pad in combination with a solid-state electrical device such as transistor assembly 11, with the member 10 being interposed between the undersurface of the metal base substrate of transistor 11 and metallic chassis 12. The thermally conductive electrically insulative member 10 is in the form of a laminate including a pair of outer layers 14 and 15, separated by a center layer 16. Outer layers 14 and 15 are preferably fabricated from compounded silicone rubber, with center layer 16 being a film of polyimide (amide) filled with a quantity of a particulate solid selected from the group consisting of aluminum oxide and boron nitride. As an alternative to silicone rubber, other film or layer forming materials with high temperature capability may be employed. As an alternate, one of the outer layers, preferably that layer which is disposed adjacent the semiconductor device, may be compounded as a pressure sensitive adhesive film, thereby enhancing the attachment of the mounting barrier to the base of the semiconductor device. Such pressure sensitive materials may be fabricated from conventional materials, including compounded silicone rubber and the like.

Films of polyimide (amide) are available commercially. Polymeric poly(imide-amides), or polyimides as they are sometimes referred to herein, as a general class of materials have been known for many years. Reference is made to U.S. Pat. Nos. 2,149,286; 2,407,896; 2,421,024; and 2,502,576. Polyimides having exceptional capabilities at high temperatures are disclosed in U.S. Pat. No. 2,710,853, these high temperature polyimides being prepared from an aromatic dianhydride such as pyromellitic dianhydride together with an aromatic diamine, and particularly 4,4' diamino diphenylether or para-phenylenediamine. Polyimides of the type disclosed in these various patents are available commercially in several forms, cured films, partially reacted resins, and the like. Such films are available commercially under the registered trademark KAPTON from E. I. DuPont de Nemours Corp. of Wilmington, Del. Moreover, such films are available commercially when filled with a particulate solid selected from the group consisting of aluminum oxide (alumina) and boron nitride. More specifically, the particulate solids preferably have a particle size with a major dimension ranging from between about 2 microns and 30 microns, and are included in the polymer matrix in an amount ranging from between about 10% and 50% by volume.

As indicated hereinabove, the aluminum oxide or boron nitride particles may be utilized as fillers for the polyimide (amide) film in an amount ranging from between about 10% and 50% by volume. For most electrical applications, however, it has been found that a loading of about 30% to 35% by volume is preferred for aluminum oxide, and about 35% by volume for boron nitride. Also, boron nitride, being anisotropic thermally, is the desired filler. Exposure to strong electrical fields may be employed in the formation of films as they are being filled and cured with boron nitride, for example, in order to enhance the anisotropic thermal characteristics.

When aluminum oxide is employed as the particulate solid, it is generally preferred that an amount of about 30% to 35% by volume of aluminum oxide particles be utilized. Also, for most purposes, particle sizes of aluminum oxide and boron nitride in the range of about 2 to 10 microns are preferred.

It has been found that silicone rubber coated polyimide (amide) films containing aluminum oxide or boron nitride particulate solids possess a desirable balance of physical and electrical properties including a toughness which enhances the ability of the members to withstand forces frequently occasioned due to over-torqued screws, and also possess a resistance to tearing, so as to reduce or eliminate the occurrences of electrical shorts caused by burr cut-throughs or cracking and a substantial reduction of thermal aging. The high temperature properties of the polyimide (amide) films, together with the silicone rubber coatings, are such that exposure to wave-solder processes is possible, a feature which is desirable for use in electronic assembly operations. In addition, the properties of silicone rubber coated polyimide (amide) films are such that resistance to deterioration due to exposure to chemicals or solvents is reduced.

The outer layers 14 and 15 of member 10 are silicone rubber layers. Preferably, the durometer of the silicone rubber layer, when cured, is in the range of about 75. Such silicone rubber polymers are available commercially, and are available from the General Electric Co. of Schenectady, N.Y. The polymers are preferably loaded with a quantity of particulate solids selected from the group consisting of aluminum oxide and boron nitride. It has been ascertained that the electrical properties of silicone rubber do not deteriorate when loaded with aluminum oxide or boron nitride particulate solids in the range contemplated herein, and for certain applications the electrical properties of the device are improved. The quantity of loading of aluminum oxide or boron nitride particles may be between about 25% and 50% by volume, and preferably in the range of between about 30% and 40% by volume based upon silicone rubber solids. The particle size is preferably in the range of from about 2 microns to 10 microns. Also, while it has been indicated that aluminum oxide or boron nitride solids may be employed, mixtures or blends of these materials may be employed as well.

Figure 2:
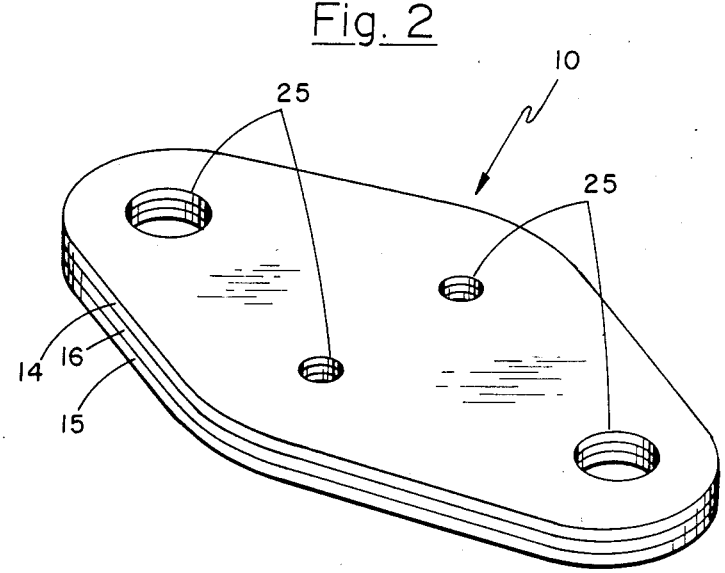
FIG. 2 is a perspective view of a typical thermally conductive electrically insulative member fabricated in accordance with the present invention.
Figure 3:
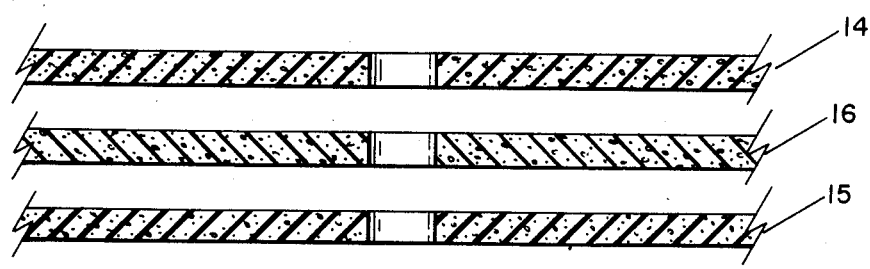
FIG. 3 is a vertical sectional view, in exploded form, illustrating the separate layers comprising the laminate of the present invention.

In a typical surface mounting application for a solid-state electronic device such as transistor 11, and with attention being directed to FIG. 1 of the drawing, transistor 11 is mounted upon chassis 12 by means of bolts 18—18, with attachment being rendered secure by nuts 19—19. Electrical insulation is achieved by virtue of the cylindrical ferrule member 19A, together with the insulating washer 19B. Also, lead pin 20 extends outwardly from conductive base member 21 of transistor assembly 11, through a glass-to-metal seal 22 and ferrule member 23. Pin 20 is appropriately coupled to the circuitry in a conventional manner. Also, in order to accommodate bolts 18—18 and lead pin 20, bores are formed in member 10 as at 25 in FIG. 2.

The thermal, electrical, and other properties of a typical product prepared in accordance with the present invention are set forth in Table I hereinbelow:

TABLE I

| PROPERTY | TYPICAL VALUE | TEST METHOD |
| --- | --- | --- |
| Thickness | .006 +/− .002 inch | |
| Continuous Use Temp. | −60 to +200° C. | |
| Volume Resistivity | $10^{13}$ minimum | ASTM D 257 |
| Dielectric Strength | 6000 Volts min. | ASTM D 149 |
| Tenacity, Minimum Film | 18.6 KPSI | ASTM D 412 |
| Thermal Conductivity | $1.2 \times 10^{-3}$ CAL/°C. CM SEC. | |
| Thermal Resistance | .40° C./W | |

In Table I, the thermal conductivity is given as that observed for an alumina filled material (18% by volume fill in the polyimide (amide) center film and 35% by volume fill in the silicone rubber layers). When boron nitride is employed, this value is increased to $1.5 \times 10^{-3}$ CAL/°C. CM SEC., it being understood that the thermal conductivity for boron nitride filled materials may be improved by certain processing techniques by virtue of its higher thermal conductivity and the anisotropic thermal behavior of the product.

In addition to alumina and boron nitride, other materials with good electrical properties and high tenperature capability may be used including, for example, silica, beryllium oxide, aluminum nitride, silicon carbide and silicon nitride.

It will be appreciated that the various modifications may be employed in connection with the fabrication of thermally conductive electrically insulative members without departing from the scope of the present invention.

What is claimed is:

1. A thermally conductive electrically insulative member for use as a chassis mounting barrier in combination with a solid-state electronic device, comprising:
   (a) a laminate comprising at least three layers and including a pair of outer layers disposed on opposite sides of a center layer, with the center layer having properties distinguishable from those of the outer layers;
   (b) said center layer comprising a film of polyimide (amide) filled with a quantity of a particulate solid selected from the group consisting of aluminum oxide and boron nitride and being included therein in an amount ranging from between about 10% and 50% by volume particulate solids, balance polyimide (amide) film;
   (c) said outer layers consisting essentially of compounded silicone base rubber.

2. The thermally conductive electrically insulative member as defined in claim 1 being particularly characterized in that said silicone rubber layers are filled with a particulate solid selected from the group consisting of aluminum oxide and boron nitride.

3. The thermally conductive electrically insulative member as defined in claim 2 being particularly characterized in that said particulate solids are included in said silicone rubber outer layers in an amount ranging from between about 25% and 50% by volume particulate solids, balance compounded silicone rubber solids.

4. The thermally conductive electrically insulative member as defined in claim 1 being particularly characterized in that said polyimide (amide) film contains substantially 35% by volume of boron nitride.

5. The thermally conductive electrically insulative member as defined in claim 4 being particularly characterized in that said silicone rubber outer layers each contains approximately 35% by volume of a particulate solid selected from the group consisting of aluminum oxide and boron nitride.

* * * * *